(12) United States Patent
Kosuge et al.

(10) Patent No.: US 6,974,156 B2
(45) Date of Patent: Dec. 13, 2005

(54) FUEL TANK STRUCTURE

(75) Inventors: Masami Kosuge, Wako (JP); Mitsuo Sugiyama, Wako (JP); Mitsuru Sayama, Wako (JP); Morio Kuroki, Wako (JP); Nagatsugu Mukaibo, Wako (JP); Hiroshi Ogasa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 111 days.

(21) Appl. No.: 10/391,229

(22) Filed: Mar. 18, 2003

(65) Prior Publication Data

US 2003/0178422 A1 Sep. 25, 2003

(30) Foreign Application Priority Data

| Mar. 19, 2002 | (JP) | ............ 2002-076781 |
| Mar. 19, 2002 | (JP) | ............ 2002-076782 |
| Mar. 19, 2002 | (JP) | ............ 2002-076783 |

(51) Int. Cl.$^7$ .................................................. B60P 3/22
(52) U.S. Cl. ........................................ 280/831; 280/834
(58) Field of Search ................ 280/831, 832, 280/834; 180/314; 220/4.14, 581, 562, 564; 137/266, 265, 264; 403/389, 396, 395; 285/124.1, 124.3

(56) References Cited

U.S. PATENT DOCUMENTS

| 3,789,820 | A | * | 2/1974 | Douglas et al. | ......... 123/27 GE |
| 4,523,548 | A | * | 6/1985 | Engel et al. | ................ 123/1 A |
| 5,577,630 | A | * | 11/1996 | Blair et al. | .................. 220/581 |
| 5,673,939 | A | * | 10/1997 | Bees et al. | ................... 280/831 |
| 5,794,979 | A | * | 8/1998 | Kasuga et al. | .............. 280/834 |
| 6,257,360 | B1 | * | 7/2001 | Wozniak et al. | ........... 180/69.5 |
| 6,481,751 | B1 | * | 11/2002 | Davis et al. | ................. 280/831 |
| 6,676,163 | B2 | * | 1/2004 | Joitescu et al. | ............. 280/834 |
| 2003/0178423 | A1 | * | 9/2003 | Sugiyama et al. | ......... 220/4.14 |

FOREIGN PATENT DOCUMENTS

| JP | 2000-219050 | | 8/2000 | |
| JP | 2003276456 A | * | 9/2003 | ........... B60K/15/03 |

* cited by examiner

*Primary Examiner*—Lesley D. Morris
*Assistant Examiner*—Daniel Yeagley
(74) *Attorney, Agent, or Firm*—Hamre, Schumann, Mueller & Larson, P.C.

(57) ABSTRACT

A fuel tank structure for a vehicle using gaseous fuel, has a plurality of cylindrical tank main bodies communicating from one another. The plurality of cylindrical tank main bodies are disposed at a fuel tank mount portion in a state of being adjoined from one another.

6 Claims, 16 Drawing Sheets

FUEL TANK STRUCTURE

BACKGROUND OF THE INVENTION

1. Field of the Invention

The present invention relates to a fuel tank structure for use in a vehicle using gaseous fuel such as natural gas.

2. Description of the Related Art

Conventionally, among vehicles using gaseous fuel such as natural gas, there are vehicles on which a large-size fuel tank 100 is mounted as shown in FIG. 16. The fuel tank 100 is usually configured in a cylindrical shape in order to uniformly disperse the pressure of fuel gas contained therein. Since the diameter of the fuel tank becomes large in order to secure a sufficient capacity, a large space such as a room 110 is utilized as a place where the fuel tank is mounted.

A partition plate 111 is provided at the rear side of the fuel tank 100 and the rear side of the partition plate is used as a practical portion for the trunk room 110.

However, since there are many useless spaces at the mounting portion of such cylindrical fuel tank 100 with a large diameter, there arise problems that the space utilization factor is degraded and the space within the vehicle such as the trunk room 110 is reduced to a large extent. Further, when the size of the fuel tank 100 is reduced, there arises a problem that the capacity of the fuel gas inevitably is reduced.

Thus, there is proposed an example (JP-A-2000-219050) wherein the fuel tank 100 is divided into two tanks each having a relatively small diameter and the two tanks are disposed in a manner that the outer peripheral surface shapes thereof fit to the lower surface shape of a rear seat 102. However, such an example is insufficient for the versatility and so is not satisfactory.

SUMMARY OF THE INVENTION

Accordingly, an object of the invention is to provide a fuel tank structure with a rigid structure which can be disposed freely at a mounting portion and can secure a sufficient capacity for fuel gas in a limited space.

In order to solve the aforesaid problems, according to the first aspect of the invention, there is provided a fuel tank structure for a vehicle using gaseous fuel, including: a plurality of cylindrical tank main bodies (for example, tank main bodies 301, 302, 501, 502, 701, 702 in embodiments) communicating with one another, the plurality of cylindrical tank main bodies being disposed at a fuel tank mount portion in a state of being adjoined with one another.

According to such a configuration, the plural cylindrical tank main bodies are disposed closely with one another in correspondence with a tank mount portion in a stacked manner and the length thereof is adjusted, whereby the configuration of the fuel tank can be freely fit to the space of the tank mount portion of a vehicle while securing a fuel gas capacity.

The fuel tank structure according to the first aspect, further includes a plate member (for example, plate members 321, 322, 52, 721, 722 in the embodiments) provided so as to cross among the plural cylindrical tank main bodies, the plate member having a communication portion (for example, communication paths 341, 342, 54, 741, 742 in the embodiments) for communicating the respective tank main bodies, wherein the respective tank main bodies are attached to the fuel tank mount portion through the plate member so as to communicate with one another.

According to such a configuration, the respective tank main bodies can be coupled by the plate member and the respective tank main bodies can communicate with one another.

In the fuel tank structure according to the second aspect, the plate member is disposed at an intermediate region between both end portions in a longitudinal direction of the respective tank main bodies.

According to such a configuration, the both end portions of the respective tank main bodies can be changed at their positions and adjusted in their lengths in correspondence with the tank mount portion, whereby the configuration of the fuel tank can be fit more freely to the space of the tank mount portion for a vehicle.

According to the third aspect of the invention, there is provided a fixing structure for a fuel tank for use in a vehicle using gaseous fuel, the fuel tank formed by coupling plural cylindrical tank main bodies (for example, tank main bodies 301, 302, 501, 502, 701, 702 in embodiments) so as to be coupled with one another is provided with a plate member (for example, a coupling plate 361, 362, 761, 762 and a communication plate 321, 322, 52, 721, 722 in the embodiments) for coupling the tank main bodies so as to cross thereamong, whereby the fuel tank is fixed to the tank mount portion of the vehicle through the plate member.

According to such a configuration, the plural tank main bodies can be disposed so as to cope with a mount space for the fuel tank, and the configuration of the fuel tank can be freely fit to the configuration of the tank mount portion for a vehicle. Further, since the fuel tank is fixed to the tank mount portion for the vehicle so as to support the plate member provided to cross among the respective tank main bodies, a shock, vibration etc. applied to the fuel tank is inputted to the plate member in a dispersed manner, so that a load applied to the outer wall of the tank main bodies can be reduced.

In the fuel tank structure of the fourth aspect, a band member (for example, a band 25 in the embodiments) is attached to the plate member, and the fuel tank is fixed to the tank mount portion through the band member.

According to such a configuration, the fuel tank is fixed to the tank mount portion through the band member attached to the plate member, so that the holding force of the band member and a shock, vibration etc. from the vehicle applied to the fuel tank is inputted to the plate member in a dispersed manner, so that a load applied to the outer wall of the tank main bodies can be further reduced.

According to the fifth aspect of the invention, there is provided a fuel tank structure for a vehicle using gaseous fuel which structure includes a plurality of cylindrical tank main bodies (for example, tank main bodies 701, 702 in an embodiment) respectively disposed within fuel tank mount portions of the vehicle so as to be aligned at their longitudinal direction, and cylindrical tank members (for example, tank members 751, 752 in the embodiment) respectively disposed at space portions (for example, space portions K1, K2 in the embodiment) caused at the peripheries of the plurality of tank main bodies so as to be aligned at their longitudinal direction with the tank main bodies, wherein each of the tank members has a diameter smaller than that of the tank main body, and the tank main bodies are respectively coupled with the tank members so as to communicate with one another.

According to such a configuration, the cylindrical tank main bodies can be disposed closely with one another so as to cope with the configuration of the fuel tank mount portion, and the cylindrical tank members each having a small diameter can be respectively disposed so as to fill the space portions caused at the peripheries of the plurality of tank main bodies, whereby the configuration of the fuel tank can be freely fit in a closed state to the configuration of the fuel tank mount portion of the vehicle.

Further, when the length of each of the tank main bodies and the tank members is adjusted, the configuration of the fuel tank can be more freely fit to the configuration of the fuel tank mount portion of the vehicle.

DETAILED DESCRIPTION OF THE PREFERRED EMBODIMENTS

Hereinafter, a first embodiment of the invention will be explained with reference to the drawings.

Figure 1:
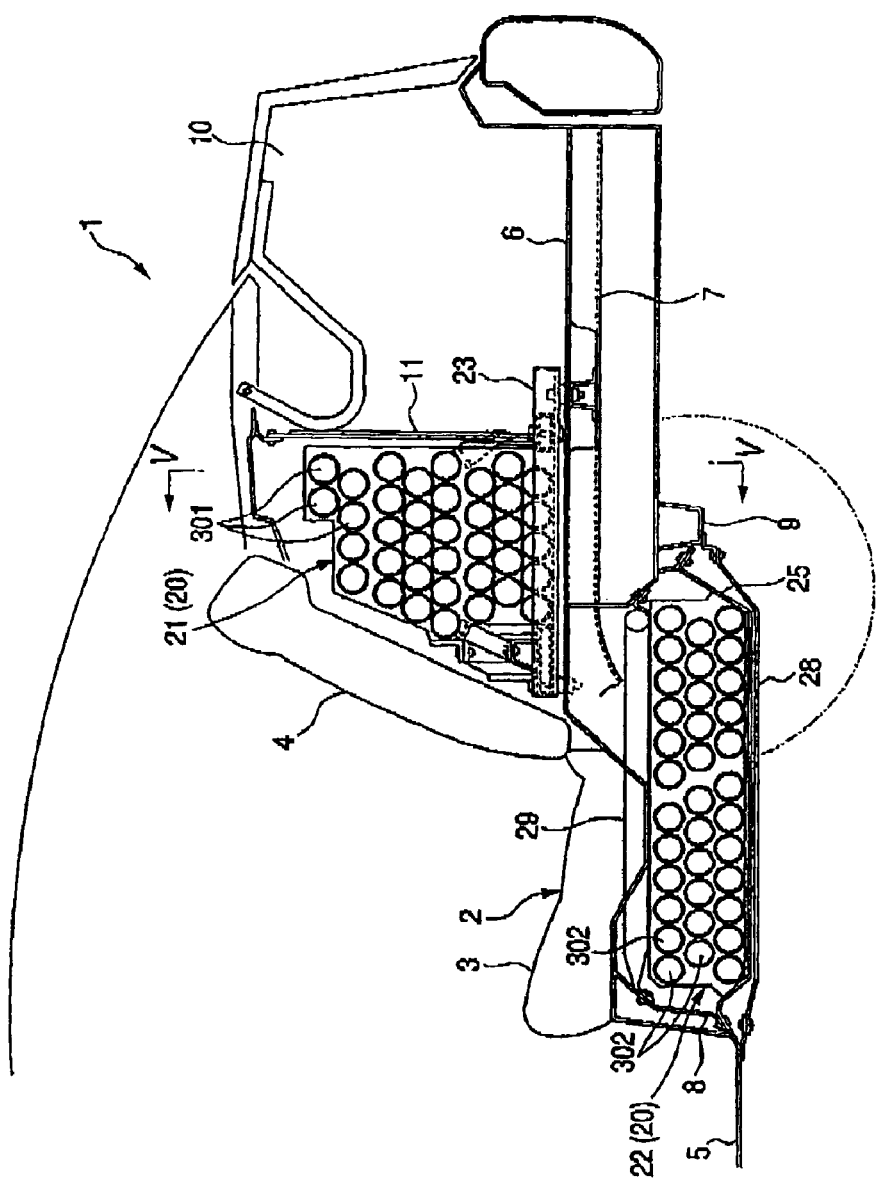
FIG. 1 is an explanatory side view of a first embodiment of the present invention.

FIG. 1 is an explanatory side view of a vehicle using natural gas, for example, according to the invention.

As shown in this figure, a first fuel tank 21 formed by coupling a plurality of tank main bodies 301 each configured in a cylindrical shape with a small diameter is disposed at the rear side of the seat back 4 of the rear seat 2 of a vehicle 1. A second fuel tank 22 formed like the first fuel tank 21 is disposed beneath the seat main body 3 of the rear seat 2.

A trunk room 10 at the rear side of the seat back 4 is partitioned into two portions in the longitudinal direction of the vehicle by a partition plate 11 and the front side portion is used as a tank mount portion at which the first fuel tank 21 is mounted.

A supporting frame 23 coupled to a pair of side frames 7, 7 extended in the longitudinal direction of the vehicle is disposed at the tank mount portion, and the first fuel tank 21 is fixed on the supporting frame 23.

A floor panel 5 is coupled through a step portion to the rear floor 6 disposed at the rear side of the step portion. A space between a middle cross member 8 and a rear cross member 9 each disposed so as to cross between the side frames 7 at the lower surface side of the rear floor 6 is used as the tank mount portion for the second fuel tank 22.

The second fuel tank 22 is sandwiched and fixed between the rear floor 6 and a pair of bands 25, 25 (band members) which are attached from the lower side of the second fuel tank 22.

Incidentally, since this tank mount portion is positioned beneath the vehicle floor (outside of the vehicle room), this tank mount portion is covered by a protector 28 from the lower side thereof, whereby the second fuel tank 22 is protected from the tipping, grounding etc. Further, a guard pipe 29 is disposed over the second fuel tank 22 so as to cross thereover in the longitudinal direction of the vehicle so that the guard pipe serves to enhance the rigidity of the vehicle body thereby to protect the tank mount portion.

The first fuel tank 21 is formed in a manner that the plurality of cylindrical tank main bodies 301 each having a small-diameter and extending in a vehicle width direction, that is, a direction perpendicular to the longitudinal direction of the vehicle are disposed in a zigzag fashion closely with one another. Also, the second fuel tank 22 is formed in a manner that a plurality of cylindrical tank main bodies 302 each having a small-diameter and extending in the vehicle width direction are disposed in a zigzag fashion closely with one another.

Each of the tank main bodies 301, 302 is a hollow cylindrical member made of extruded aluminum, for example. In this embodiment, each of the tank main bodies 301, 302 contains therein activated charcoal etc. for absorbing and reserving gaseous fuel therein.

The tank main bodies 301 communicate with one another through a communication plate 321 (plate member) described later, and also the tank main bodies 302 communicate with one another through a communication plate 322 (plate member) described later. Thus, each of the first fuel tank 21 and the second fuel tank 22 is constituted as an absorption type low-pressure gas tank of an integration type. Further, the first fuel tank 21 and the second fuel tank 22 communicate with each other to constitute a fuel tank 20 of the vehicle 1.

Figure 2:
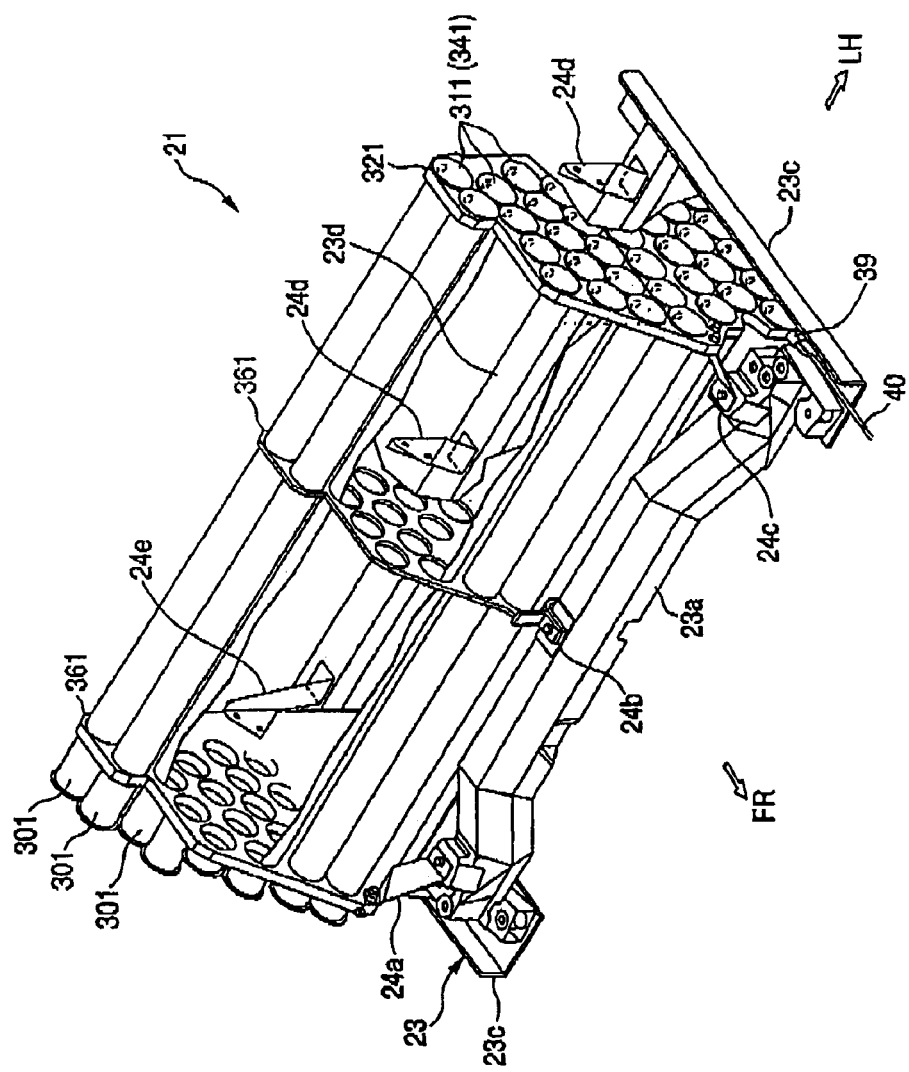
FIG. 2 is a perspective view of a first fuel tank of the first embodiment of the invention when seen from the right front side thereof.

FIG. 2 is a perspective view of the first fuel tank 21 when seen from the left front side thereof.

As shown in the figure, the first fuel tank 21 is configured in a manner that the plurality of tank main bodies 301 stacked in the vertical direction are coupled and fixed to one another in a state of being aligned at their left side end portions thereof (a side shown by an arrow LH in the figure).

Specifically, the communication plate 321 made of aluminum, for example, is attached at the left side end portions of the tank main bodies 301 so as to cross thereamong and two coupling plates 361, 361 (plate members) made of aluminum, for example, are attached at two intermediate regions at both end portions of the tank main bodies 301 so as to cross thereamong, respectively, thereby to join the tank main bodies 301 with one another.

A communication hole 311 is formed at the left side end portion of each of the tank main bodies 301, and the tank main bodies 301 communicate with one another through a communication path 341 (communication portion) formed within the communication plate 321.

Further, the extended position of the right side end portion of each of the tank main bodies 301 is individually changed so as to cope with the vehicle body configuration of the right side wall of the vehicle room thereby to cope with the change in the vehicle width direction of the configuration of the tank mount portion.

The first fuel tank 21 is mounted in a manner that the communication plate 321 and a coupling plate 361 on the right side in the vehicle width direction are supported by the side frames 23c, 23c of the supporting frame 23 each constituted in a cross shape.

Stays 24a, 24c, each formed by subjecting a steel plate to a bending molding process, for example, are fastened at the one end sides thereof by bolts and nuts to the front end portion of the communication plate 321 and the front end portion of the coupling plate 361 on the right side in the vehicle width direction, respectively. A bracket 24b, having a forwardly protruded bolt attachment portion and formed by subjecting aluminum material to the bending molding process, for example, is joined by a welding process to the front end portion of the coupling plate 361 provided at the almost center portion in the vehicle width direction. Similarly, stays 24d, 24e, each formed by subjecting a steel plate to the bending molding process, for example, are fastened at the one end sides thereof by bolts and nuts to the rear end portion of the communication plate 321 and the rear end portions of the respective coupling plates 361, respectively.

The other end sides of these stays 24a, 24c and the bolt attachment portion of the bracket 24b are fastened to the front frame 23a of the supporting frame 23 by means of bolts and nuts, and also the other end sides of these stays 24d, 24e are fastened to the rear frame 23b of the supporting frame 23 by means of bolts and nuts, whereby the first fuel tank 21 is fixed on the supporting frame 23.

A connector 39 and a pipe 40 are provided on the front side end surface (a side shown by an arrow FR in the figure) of the communication plate 321 thereby to form a communication path with the second fuel tank 22.

Figure 3:
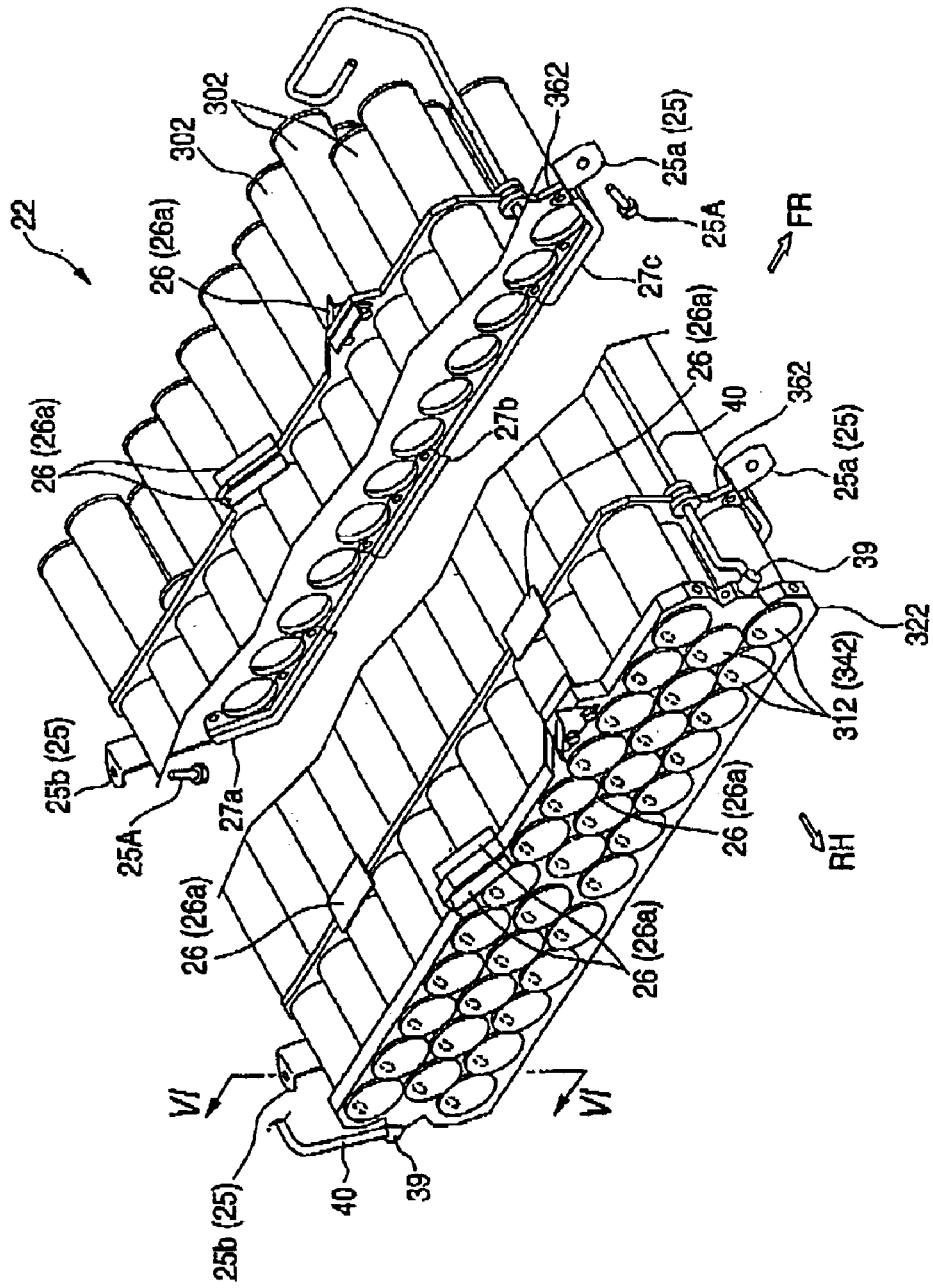
FIG. 3 is a perspective view of a second fuel tank of the first embodiment of the invention when seen from the left front side thereof.

FIG. 3 is a perspective view of the second fuel tank 22 when seen from the right front side thereof.

As shown in the figure, the second fuel tank 22 is configured in a manner that the plurality of tank main bodies 302 stacked in three stages, for example, in the vertical direction are coupled and fixed from one another in a state of being aligned at their right side end portions thereof (a side shown by an arrow RH in the figure).

Specifically, the communication plate 322 made of aluminum, for example, is attached at the right side end portions of the tank main bodies 302 so as to cross thereamong and two coupling plates 362, 362 (plate members) made of aluminum, for example, are attached at two intermediate regions at both end portions of the tank main bodies 302 so as to cross thereamong, respectively, thereby to join the tank main bodies 302 from one another.

A communication hole 312 is formed at the right side portion of each of the tank main bodies 302, and the tank main bodies 302 are communicated from one another through communication paths 342 (communication portions) formed within the communication plate 322.

Further, the extended position of the left side end portion of each of the tank main bodies 302 is individually changed so as to cope with the change in the vehicle width direction of the adjacent side frame 7 thereby to cope with the change in the vehicle width direction of the configuration of the tank mount portion.

The outer configuration of each of the lower portions of the front and rear edge portions of the coupling plates 362, 362 is formed in a taper shape expanding upward.

The aforesaid bands 25, 25 are attached to the lower edge portions of the coupling plates 362, 362, respectively.

The band 25 is formed by a high tensile steel plate. The bands are bent upward from the lower edge portions of the corresponding coupling plates 362 so as to follow along the front and rear edge portions thereof. Further, the tip end portions of the bands 25 are bent in the front and rear directions thereby to form attachment portions 25a, 25b to be attached to the vehicle body, respectively.

Bolts 25A are respectively passed through the attachment portions 25a, 25b from the lower direction thereof, and the bolts 25A are fastened to the middle cross member 8 and the rear cross member 9, whereby the second fuel tank 22 is pushed upward and so pressed against and fixed to the rear floor 6.

Guide brackets 27a, 27b, 27c are attached to the lower edge portion of each of the coupling plates 362 in order to stably support the outer peripheral surface of the coupling plate 362 by the band 25.

Each of the coupling plates 362 and the communication plates 322 is provided at its upper edge portion with abutment surfaces 26 abutting against the rear floor 6, and each of the abutment surfaces 26 is provided with a cushion rubber 26a to be inserted between the abutment surface and the rear floor 6.

A connector 39 and a pipe 40 are provided on the front side end surface (a side shown by the arrow FR in the figure) of the communication plate 322 thereby to form a fuel gas supply path to an engine (not shown). Also, a connector 39 and a pipe 40 are also provided on the rear side end surface of the communication plate 322 thereby to form a communication path with the first fuel tank 21.

Figure 4:
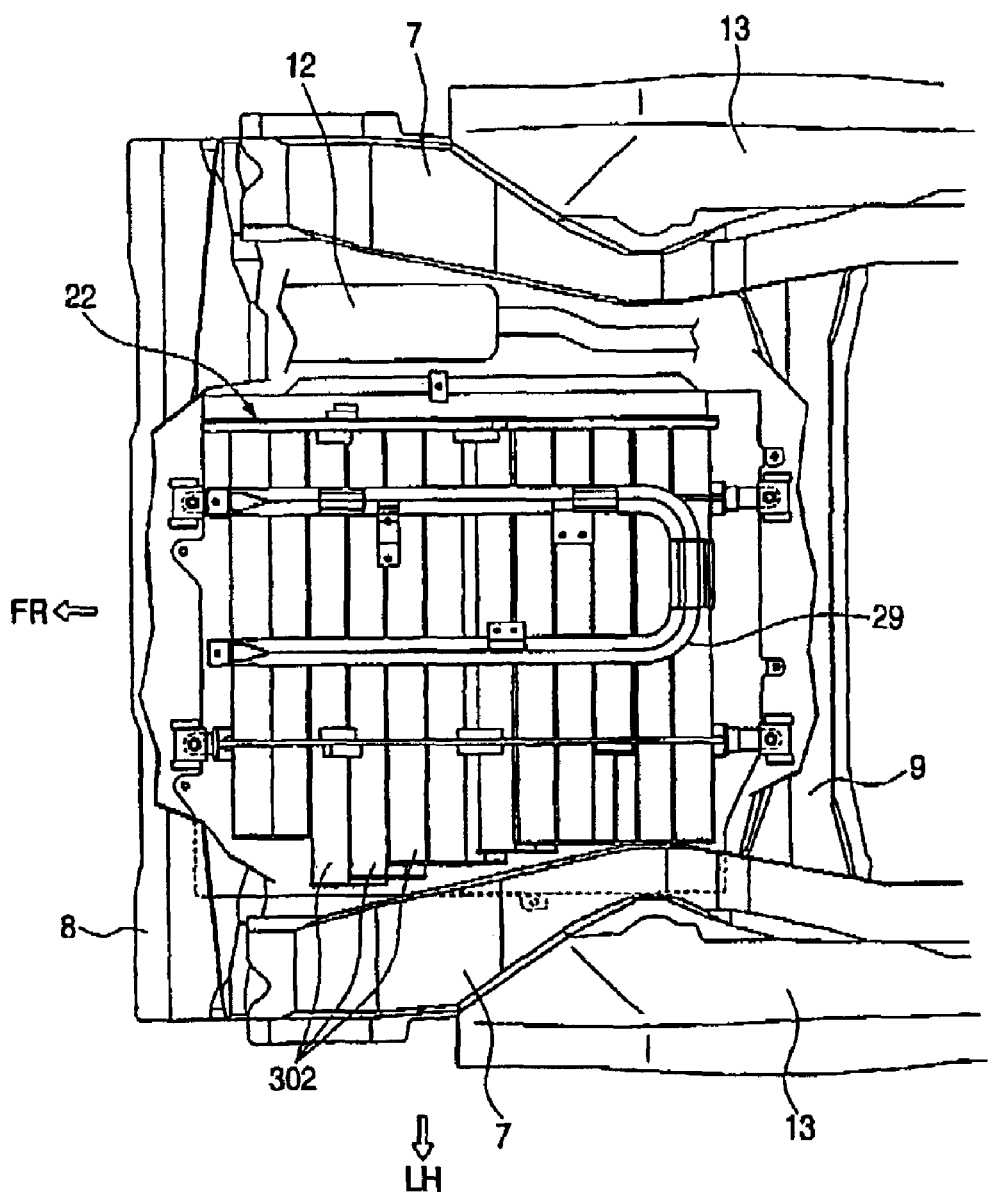
FIG. 4 is a plan view of the second fuel tank and the peripheral portion thereof.

FIG. 4 is a plan view of the second fuel tank 22 and the peripheral portion thereof.

As shown in the figure, the second fuel tank 22 is disposed at a position surrounded by a pair of the side frames 7, 7 extending in the longitudinal direction (in the left and right direction in FIG. 4) and the middle cross member 8 and the rear cross member 9 each extending in the vehicle width direction (elevational direction in FIG. 4). Further, the extended position of the left side end portion of each of the tank main bodies 302 is individually changed so as to cope with the change in the vehicle width direction of the side frame 7 thereby to cope with the change of the configuration in the vehicle width direction of the tank mount portion.

The reference numeral 29 depicts the guard pipe formed in a U-shape and reference numeral 12 depicts an exhaust unit.

Figure 5:
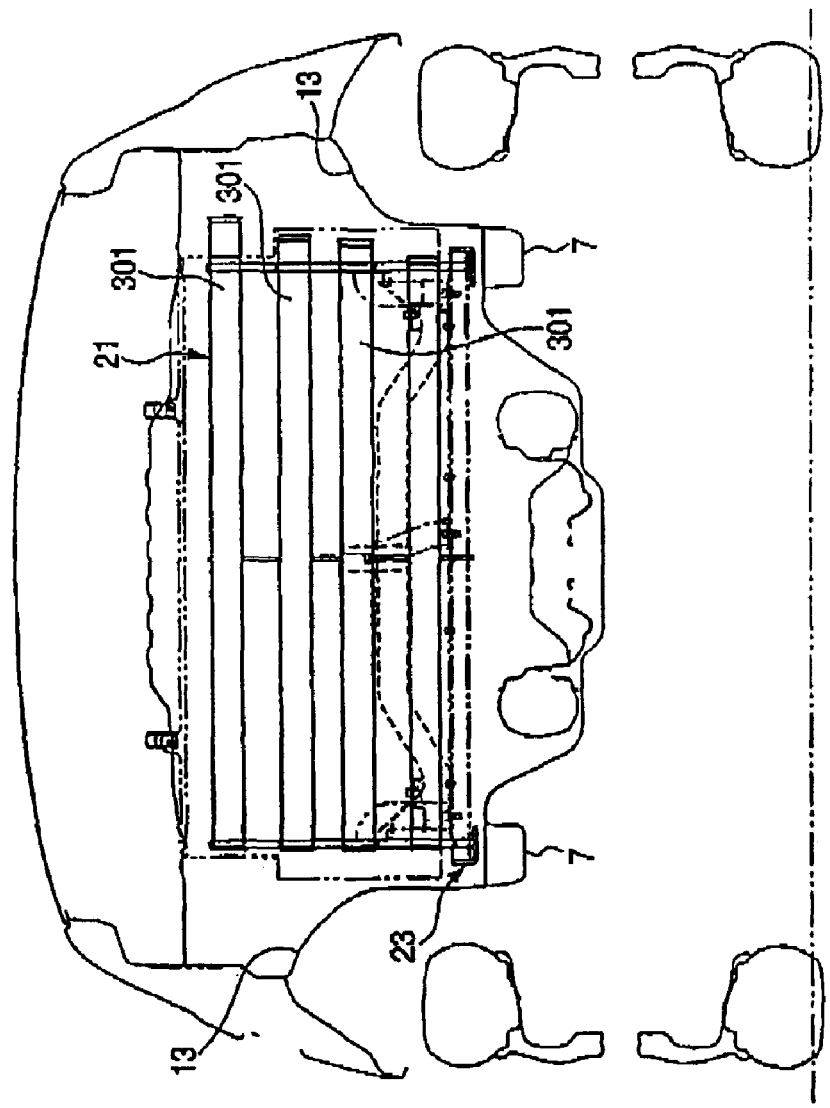
FIG. 5 is a sectional view along a line V—V in FIG. 1.

FIG. 5 is a sectional diagram along a line V—V in FIG. 1.

As shown in the figure, the first fuel tank 21 is disposed at the inside of a wheelhouse 13 expanding at the inside in the vehicle width direction. However, the extended position of the right side end portion of each of the tank main bodies 301 is individually changed so as to cope with the configuration of the right side wall of the vehicle room thereby to cope with the change of the configuration in the vehicle width direction of the tank mount portion.

Next, an explanation will be made as to the internal communication structure of each of the tank main bodies 302 of the second fuel tank 22. Since the communication structure of the first fuel tank 21 is same as that of the second fuel tank 22, the explanation thereof is omitted.

Figure 6:
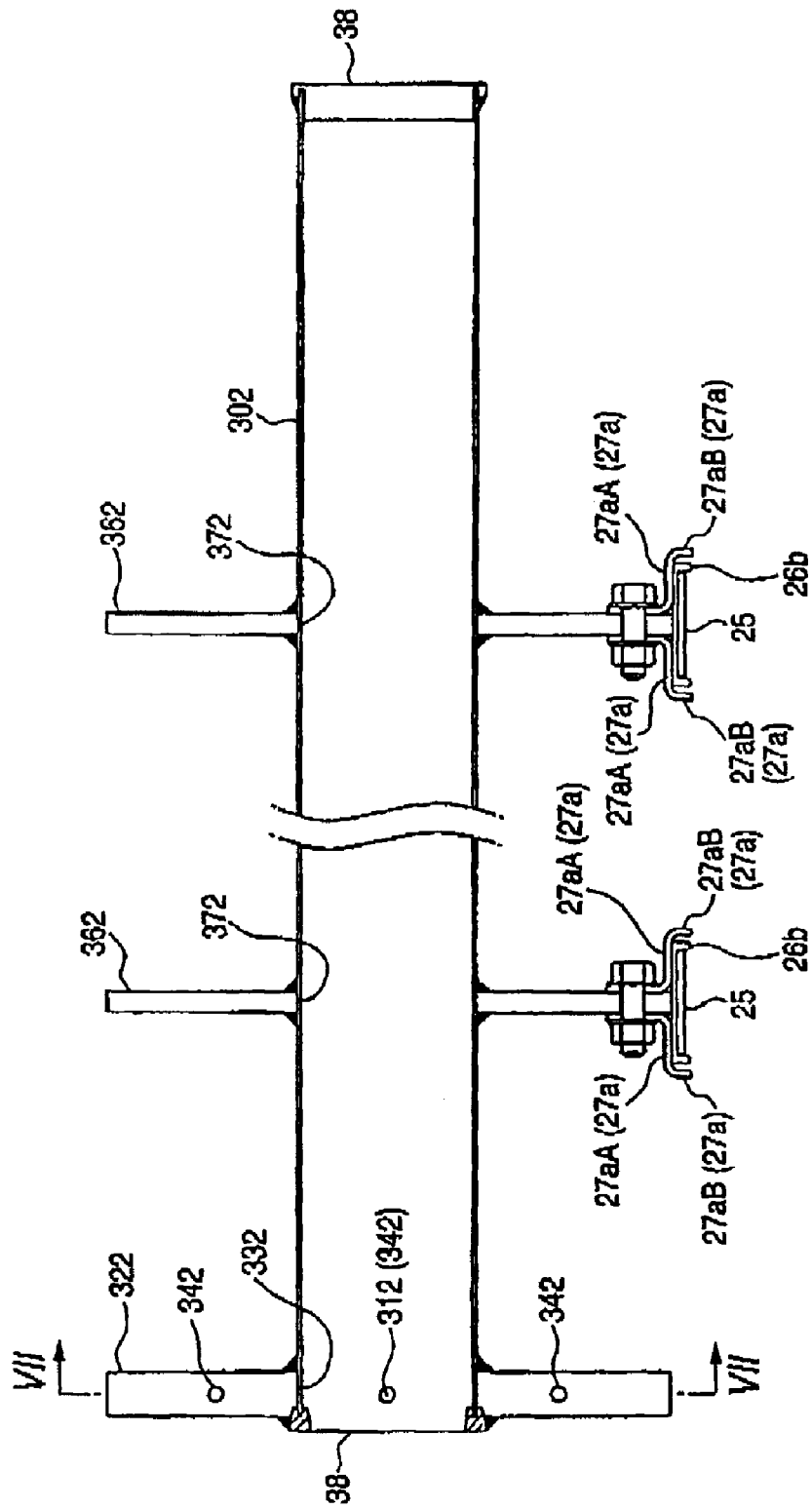
FIG. 6 is a sectional view along a line VI—VI in FIG. 3.

FIG. 6 is a sectional diagram along a line VI—VI in FIG. 3.

As shown in this figure, a cap 38 is jointed by a friction stirring welding, for example, to each of the opening portions of the both ends of the tank main body 302.

The tank main body 302 is joined with the entire circumferential periphery of the through hole 332 of the communication plate 322. Also, the tank main body 302 is entirely or partially joined with the circumferential peripheries of the through holes 372, 372 of the coupling plates 362, 362.

A pair of the communication holes 312, 312 are provided at the right side end portion of the tank main body 302 so as to oppose each other. The communication path 342 is provided at an almost intermediate portion in the thickness direction of the communication plate 322 so as to correspond to the communication hole 312 of the tank main body 302.

A pair of the guide brackets 27a, 27a serving as a guide for the band 25 are fastened by means of bolts and nuts so as to sandwich the lower edge portion of each of the coupling plates 362.

Each of the guide brackets 27a is formed by a steel plate having been subjected to a press molding, for example. Each of the guide brackets 27a is formed along the outer peripheral surface of the lower edge portion of the coupling plate 362 and is provided with a supporting wall 27aA so as to broaden the width of this outer peripheral surface to cope with the width of the band 25. Further, the side edge portion of each of the supporting walls 27aA is bent toward the lower side (the band 25 side) to form a supporting wall 27aB. A cushion rubber 26b is inserted between the band 25 and the guide brackets 27a, 27a and the coupling plate 362.

Thus, even if a tension is applied to the band 25 at the time of fixing the first fuel tank 21, the band 25 is prevented from falling from the lower edge portion of the coupling plate 362 due to the presence of the supporting walls 27aA of the respective guide brackets 27a. Further, in that case, the band 25 is prevented from shifting in the vehicle width direction due to the presence of the supporting walls 27aB, whereby the coupling plate 362 of the first fuel tank 21 can be stably supported.

In this respect, each of the guide brackets 27b, 27c also has the configuration similar to that of the guide bracket 27a. As shown in FIG. 3, since these guide brackets 27b, 27c are equally disposed along the front and rear edge portions from the lower edge portion of the coupling plate 362, respectively, even if a tension is applied to the band 25, the coupling plate 362 can be supported stably. Thus, the first fuel tank 21 can be stably fixed to the tank mount portion beneath the floor of the vehicle 1.

Figure 7:
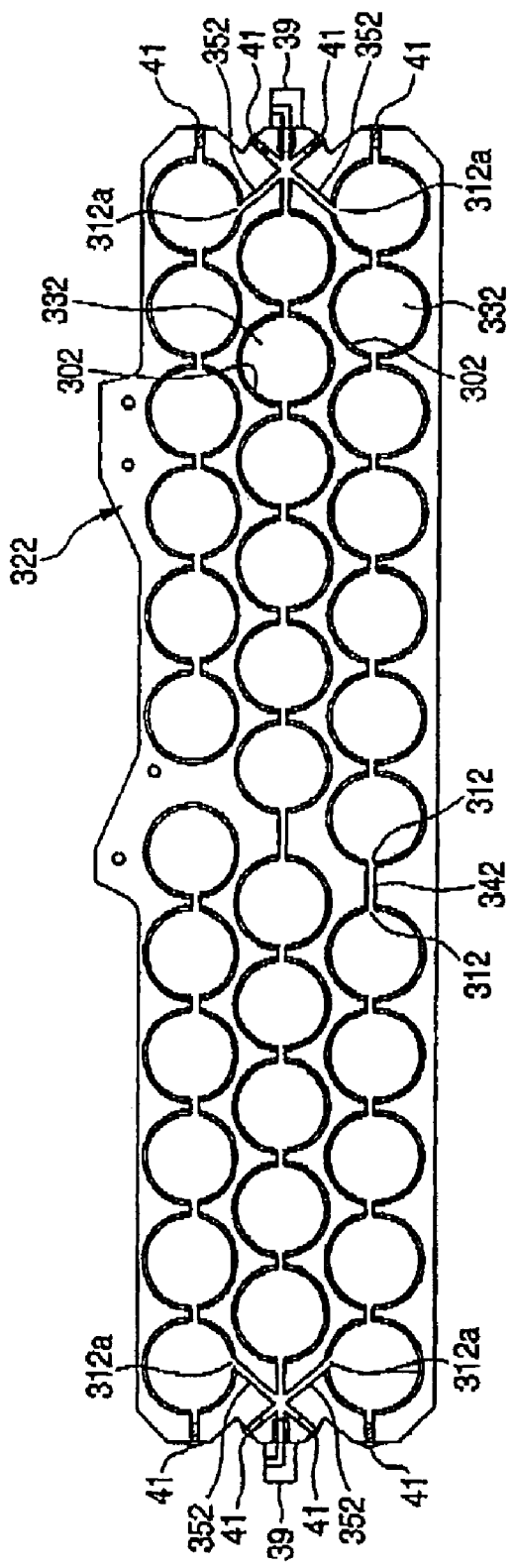
FIG. 7 is a sectional view along a line VII—VII in FIG. 6.

FIG. 7 is a sectional diagram along a line VII—VII in FIG. 6.

As shown in this figure, the respective through holes 332 are provided so as to be stacked in three stages in a vertical direction. A communication path 342 is provided between adjacent through holes 332, 332 at each stage of the through holes 332 so as to pass almost the center portion thereof, at a position extending along the front and rear (left and right in FIG. 5) end surfaces of the communication plate 322.

Further, at each of the front and rear end portions of the communication plate 322, two upper and lower communication paths 352, 352 are formed so as to cross with the through holes 332 of the upper and lower stages and the communication path 342 of the middle stage and further are opened at a corresponding one of the front and rear end surfaces of the communication plate 322.

Each of the tank main bodies 302 corresponding to the upper and lower communication paths 352, 352 among all the tank main bodies 302 is provided with a communication hole 312a. At each of the front and rear end surfaces of the communication plate 322, a connector 39 is screwed to the opening portion of the communication path 342 of the intermediate stage and blocking plugs 41 are fixedly secured to the opening portions of the remaining communication paths 342 and the upper and lower communication paths 352, respectively.

According to the aforesaid configuration, the plurality of tank main bodies 301 closely disposed in a stacked manner are coupled from one another by the coupling plates 361 and the communication plate 321, and also the plurality of tank main bodies 302 closely disposed in a stacked manner are coupled with one another by the coupling plates 362 and the communication plates 322. Further, the internal portions of the tank main bodies 301, 302 each being blocked communicate by means of the communication plate 321, 322 etc., respectively. Thus, the plurality of tank main bodies 301, 302 are integrated as the single fuel tank 20.

The configuration of the fuel tank 20 can be freely fitted to the configuration of the tank mount portion by adjusting the length to the end portion of each of the tank main bodies 301, 302 and also by adjusting the number of the stacks of the tank bodies. Thus, the tank mount portions within the trunk room 10 and beneath the rear floor 6 can be made small while securing a sufficient fuel gas capacity, and the space within the vehicle room such as the trunk room 10 etc. can be secured sufficiently.

Further, a communication pipe etc. is not protruded from the end surface at the one end side of each of the tank main bodies 301, 302, and the extended position of the end portion at the other side of each of the tank main bodies can be individually changed, whereby the fuel tank mount portions can be utilized efficiently as the fuel gas containing portion without waste.

Further, the fuel tank 20 is fixed to the tank mount portion of the vehicle 1 through the coupling plates 361, 362 and the communication plates 321, 322, which are provided so as to cross over the respective tank main bodies 301, 302. Thus, a shock, vibration etc. inputted from the vehicle 1 is not directly applied to the tank main bodies 301, 302 but inputted to the coupling plates 361, 362 and the communication plates 321, 322 in a dispersed manner. Therefore, a load applied to the respective tank main bodies 301, 302 can be reduced, and hence the light weighting and cost reduction of the fixing structure for the fuel tank can be attained while suppressing the intensity and rigidity of the respective tank main bodies 301, 302 to a required minimum degree.

Further, the second fuel tank 22 mounted beneath the rear floor 6 is supported in a manner that each of the coupling plates 362 provided so as to cross over the respective tank main bodies 302 is supported so as to be pushed up at outer peripheral surface of the lower edge portion thereof by the band 25 and the outer peripheral surface of the lower edge portion of the coupling plate 362 is pushed against the rear floor 6, whereby the second fuel tank 22 is fixed to the tank mount portions.

Thus, the holding force of the band 25 is not directly applied to the outer walls of the tank main bodies 302 but inputted to the coupling plate 362 in a dispersed manner. Therefore, a load applied to each of the tank main bodies 302 can be reduced, and hence the light weighting and cost reduction of the fixing structure for the fuel tank can be attained while suppressing the intensity and rigidity of the respective tank main bodies 301, 302 to a required minimum degree.

Figure 8:
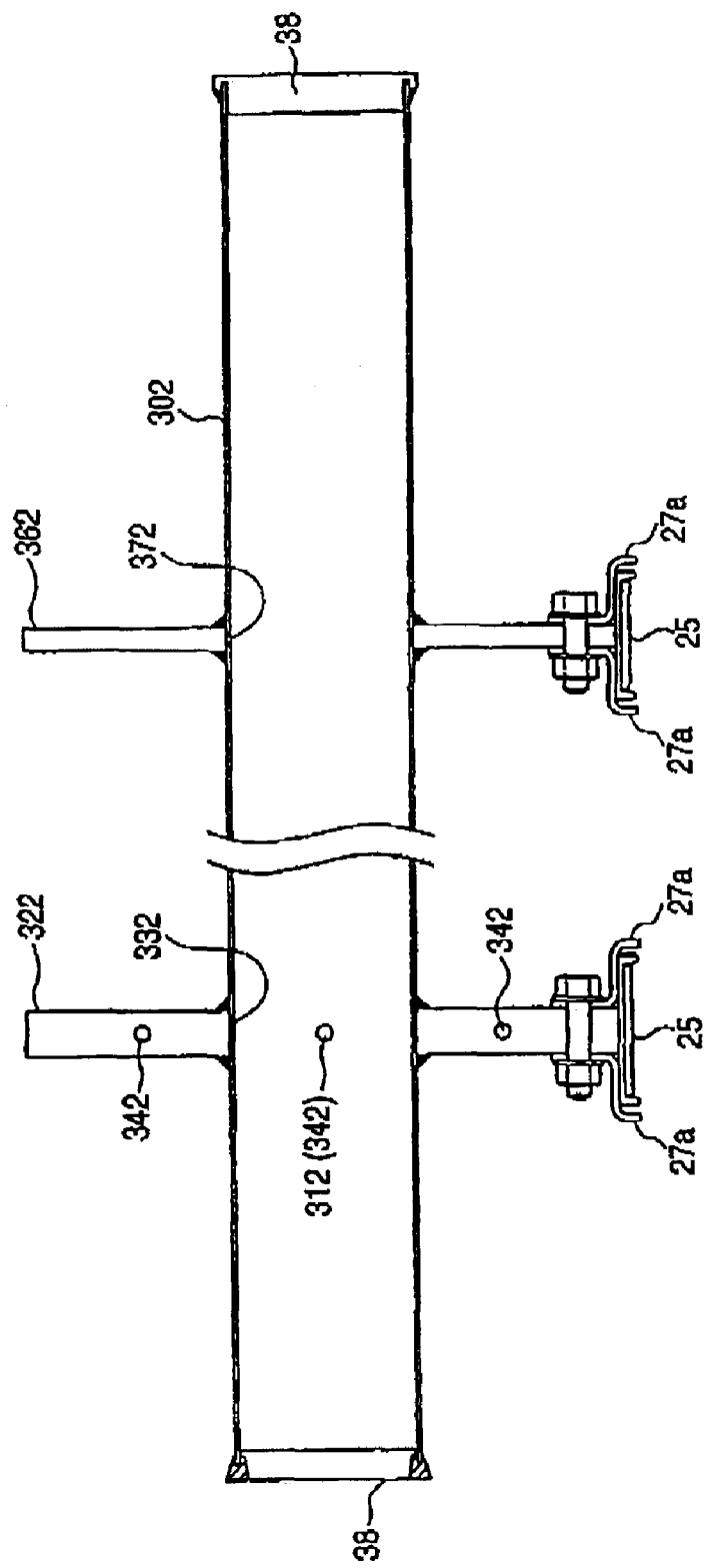
FIG. 8 is a sectional view showing a modification of the first embodiment.

In a modification of the first embodiment, as shown in FIG. 8, the communication plate 321 may not be provided at the end portion of the tank main bodies 301 but may be provided at the position where one of the coupling plates 361 is disposed, and also the communication plate 322 may not be provided at the end portion of the tank main bodies 302 but may be provided at the position where one of the coupling plates 362 is disposed.

According to such a configuration, in the first fuel tank 21, the number of the coupling plates 361 can be reduced from two to one, and the extended position of the left side end portion of each of the tank main bodies 301 can be individually changed like the right side end portion thereof. Further, in the second fuel tank 22, the number of the coupling plates 362 can be reduced from two to one, and the extended position of the right side end portion of each of the tank main bodies 302 can be individually changed like the left side end portion thereof.

Accordingly, the number of the parts of the fuel tank 20 can be reduced and the tank mount portions can be utilized further efficiently without waste as the fuel gas containing portion.

Next, a second embodiment according to the invention will be explained with reference to FIGS. 9 and 10.

In this embodiment, each of the tank main bodies 301, 302 is changed from a cylindrical shape to a multi-cell configuration.

Figure 9:
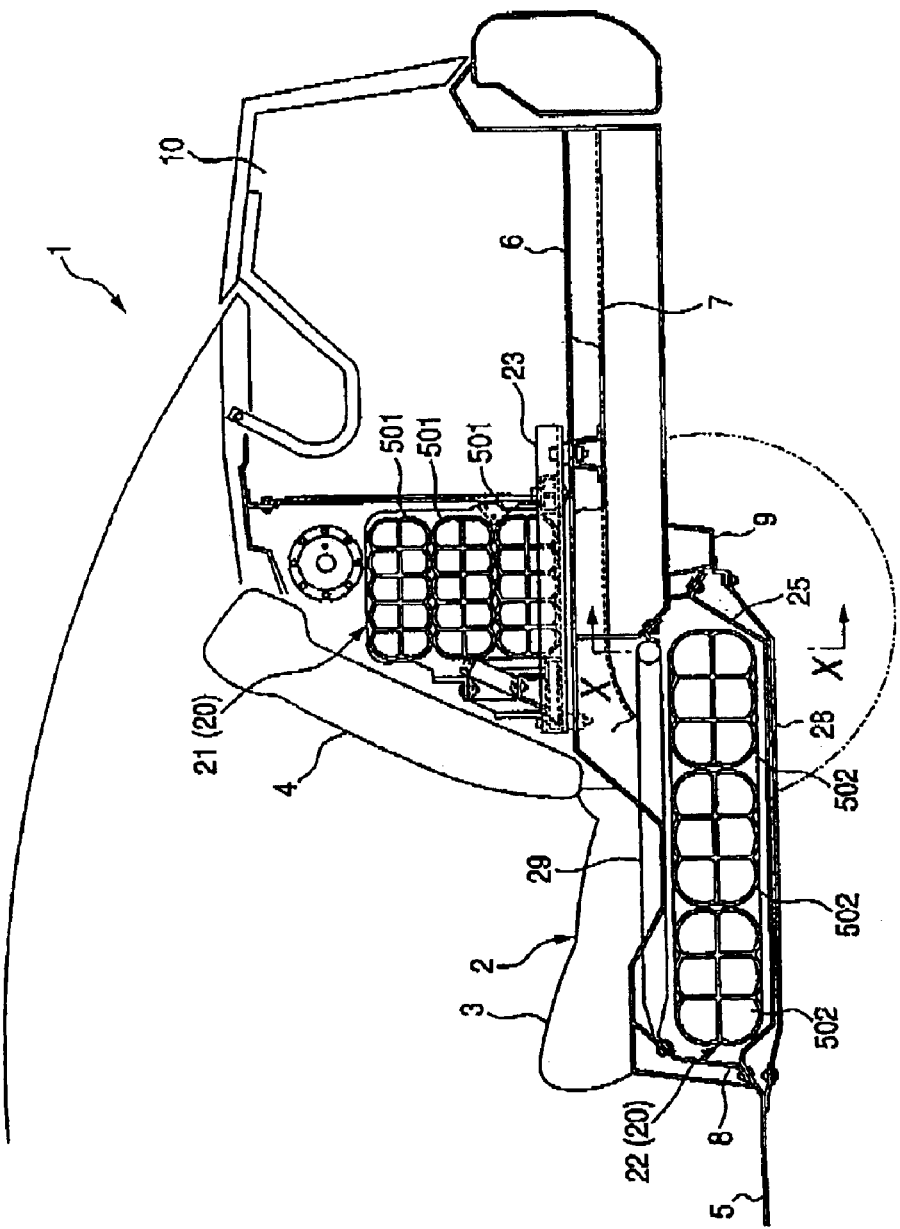
FIG. 9 is an explanatory side view of a second embodiment of the invention.

Since FIG. 9 is an explanatory side view corresponding to FIG. 1, portions identical to those of FIG. 1 are referred to by the common symbols, with explanation thereof being omitted.

As shown in FIG. 9, each of the tank main bodies 501 and the tank main bodies 502 is formed by extruded aluminum material, for example, of a multi-cell configuration. A plurality of the tank main bodies 501 are coupled to form the first fuel tank 21 and a plurality of the tank main bodies 502 are coupled to form the second fuel tank 22.

Next, the inner communication structure of the respective tank main bodies 502 will be explained. Although the following explanation will be made as to the second fuel tank 22 as an example, since the inner communication structure of the first fuel tank 21 is similar to that of the second fuel tank, the explanation thereof will be omitted.

Figure 10:
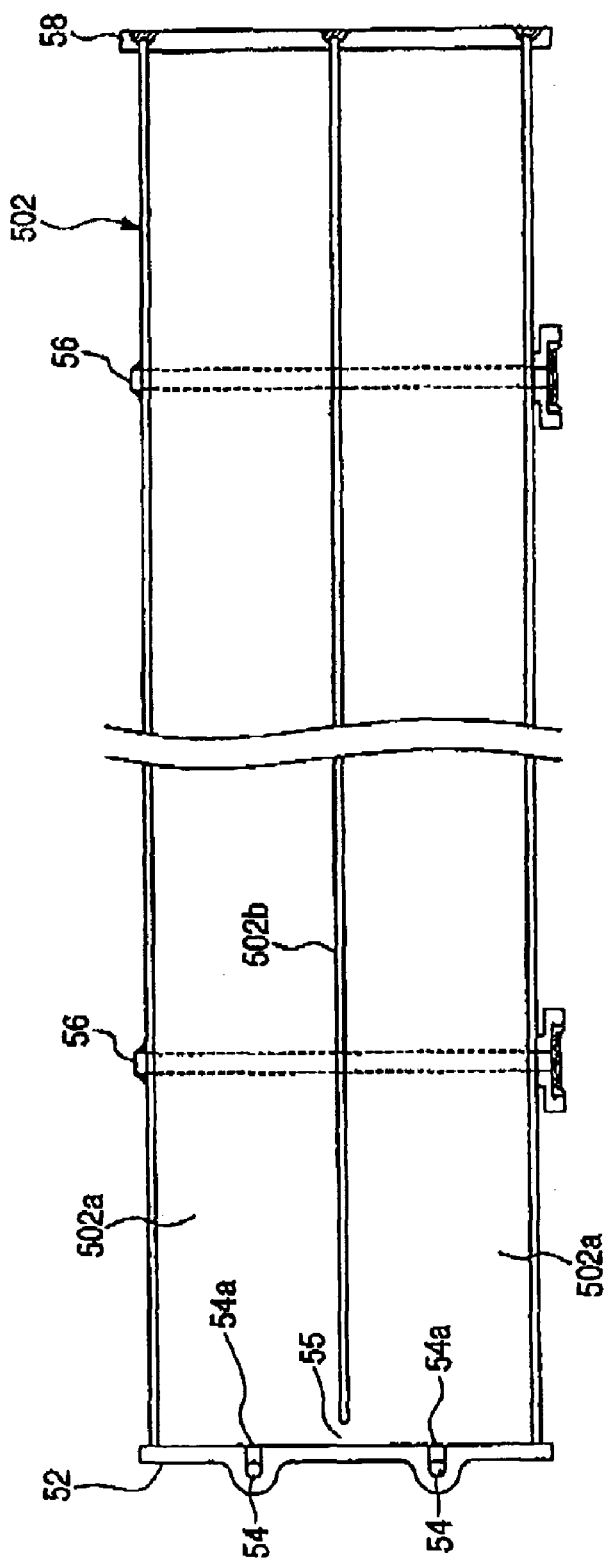
FIG. 10 is a sectional view along a line X—X in FIG. 9.

FIG. 10 is a sectional diagram along a line X—X in FIG. 9.

As shown in the figure, an integration type plate member 52 formed by extruded aluminum material, for example, and extended across the respective tank main bodies 502 is joined to the left side end surface of the tank main bodies 502. Also, a plate 58 formed by aluminum, for example, is joined to the right side end surface of the tank main bodies 502.

Two coupling plates 56, 56 are fixed through a welding process to the tank main body 502 so as to cross over the intermediate regions between the both end portions of the tank main body 502.

The plate member 52 is provided at its sectional area with two communication paths 54, 54 (communication portions).

These two communication paths 54 are provided at each of the tank main bodies 502 so as to extend over two cells 502a, 502a aligned in a direction perpendicular to the extending direction of the communication paths.

Since a communication hole 54a is provided between the communication path 54 and each of the cells 502a, the inner portions of the respective cells 502a are integrated for each of the communication paths 54. Further, since a notch 55 is provided at each of partition walls 502b of the respective cells 502a which are aligned perpendicular to the communication paths 54, the respective communication paths 54 communicate with one another.

According to the aforesaid configuration, a plurality of the tank main bodies 501, 502 each formed in the multi-cell configuration are integrated as a single fuel tank 20. Thus, like the first embodiment, the fuel tank mount portion within the trunk room 10 and beneath the rear floor 6 can be reduced and a sufficient space can be secured within the vehicle such as the trunk room 10 while securing a sufficient fuel gas capacity.

Further, since each of the tank main bodies 501, 502 is formed as the multi-cell configuration, there is no space which is caused when the cylindrical tank main bodies 301, 302 are disposed close to one another, and hence a smaller-sized fuel tank 20 with the same capacity can be realized. Thus, the tank mount portion can be further miniaturized and so a space for disposing various kinds of devices etc. can be secured.

Further, since the number of the parts can be reduced to a large extent, the cost at the time of an assembling procedure etc. can be reduced.

Next, a third embodiment of the invention will be explained with reference to the drawings.

Figure 11:
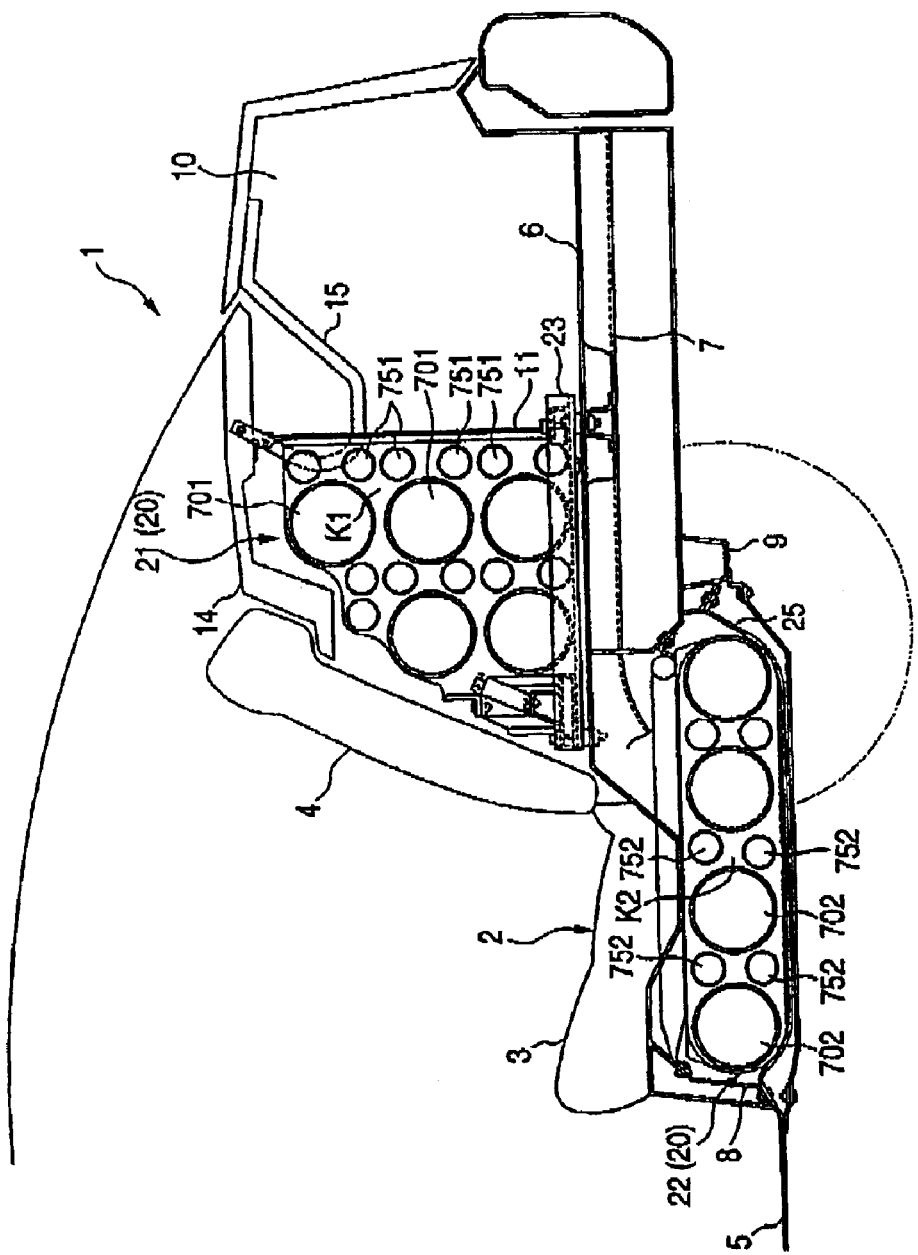
FIG. 11 is an explanatory side view of a third embodiment of the present invention.

FIG. 11 is a side sectional view of a vehicle using natural gas, for example, according to the invention. Since FIG. 11 is an explanatory side view corresponding to FIG. 1, portions identical to those of FIG. 1 are referred to by the common symbols, with explanation thereof being omitted.

As shown in this figure, a first fuel tank 21 formed by coupling a plurality of cylindrical tank main bodies 701 and a plurality of tank members 751 each having a diameter smaller than that of the tank main body is disposed at the rear side of the seat back 4 of the rear seat 2 of a vehicle 1. A second fuel tank 22 formed by coupling a plurality of cylindrical tank main bodies 702 and a plurality of tank members 752 each having a diameter smaller than that of the tank main body 702 is disposed beneath the seat main body 3 of the rear seat 2.

A trunk room 10 at the rear side of the seat back 4 is partitioned into two portions in the longitudinal direction of the vehicle by a partition plate 11. The front side portion thus partitioned, that is, a space which is sandwiched in the longitudinal direction between the seat back 4 and the partition plate 11 and sandwiched in the vertical direction between a rear shelf 14 and a rear floor 6 is used as a tank mount portion at which the first fuel tank 21 is mounted. The tank mount portion is formed to be narrow at its front side upper portion since the seat back 4 is slanted and the rear shelf 14 is extended downward so as to support the seat back 4.

The first fuel tank 21 is configured in a manner that the plurality of cylindrical tank main bodies 701 extending in the vehicle width direction is provided as a major fuel gas containing portion and also the cylindrical tank members 751 each having a diameter smaller than that of the tank main body 701 is disposed as another fuel gas containing portion at space portions K1 at the peripheries of the respective tank main bodies 301, that is, space portions provided at the peripheries of the respective tank main bodies 701 when the tank main bodies 701 are disposed at the tank mount portion of the first fuel tank 21.

Similarly, the second fuel tank 22 is configured by the plurality of cylindrical tank main bodies 702 extending in the vehicle width direction and the cylindrical tank members 752 each having a diameter smaller than that of the tank main body 702 disposed at space portions K2 at the peripheries of the respective tank main bodies 702.

In this respect, each of the tank main bodies 701 and 702 is set to have a diameter as large as possible so that the corresponding tank mount portion is divided into the minimum numbers of sections. Further, the diameter of each of the tank members 751 and 752 is set so as to correspond to a space portion available when the respective tank main bodies are disposed at the corresponding tank mount portion.

The first fuel tank 21 is arranged in a manner that the tank main bodies 701 of two stages and the tank main bodies 701 of three stages are disposed at the front side and the rear side, respectively, so as not to interfere with the seat back 4 and the rear shelf 14 constituting the tank mount portion. Further, in order to set the length of each of the tank main bodies 701 as long as possible (see FIG. 15), each of the tank main bodies 701 is disposed at positions closer to the front side of the tank mount portion so as to avoid a trunk hinge 15 provided at the rear side upper portion of the tank mount portion.

The plurality of small-diameter tank members 751 are respectively disposed at the space portions K1 at the peripheries of the tank main bodies 701 so as to fill up the spaces. The tank members 751 are also disposed so as to avoid the rear shelf 14 at the front side upper portion of the tank mount portion. At the rear side upper portion of the tank mount portion, the extending positions of the end portions of the tank members 751 are adjusted so as not to interfere with the trunk hinge 15 (see FIG. 15).

In the second fuel tank 22, the four tank main bodies 702 are disposed almost with a constant interval in the longitudinal direction within the tank mount portion and the tank members 752 are disposed at the space portions K2 at the peripheries of the respective tank main bodies 702. Each of the tank main bodies 702 and the tank members 752 is adjusted at the extended position of the end portions thereof so as to cope with the change of the tank mount portion in the vehicle width direction (see FIG. 14).

Each of the tank main bodies 701, 702 and the tank members 751, 752 is a hollow cylindrical member made of extruded aluminum, for example. In this embodiment, each of the tank main bodies 701, 702 and the tank members 751, 752 contains therein activated charcoal etc. for absorbing and reserving gaseous fuel therein and is closed at the both ends.

The tank main bodies 701 and the tank members 751 of the first fuel tank 21 communicate with one another through a communication plate 721 (plate member) described later, and the tank main bodies 702 and the tank members 752 of the second fuel tank 22 communicate with one another through a communication plate 722 (plate member) described later. Thus, each of the first fuel tank 21 and the second fuel tank 22 is constituted as an absorption type low-pressure gas tank of an integration type. Further, the first fuel tank 21 and the second fuel tank 22 communicate with each other to constitute a fuel tank 20 of the vehicle 1.

Figure 12:
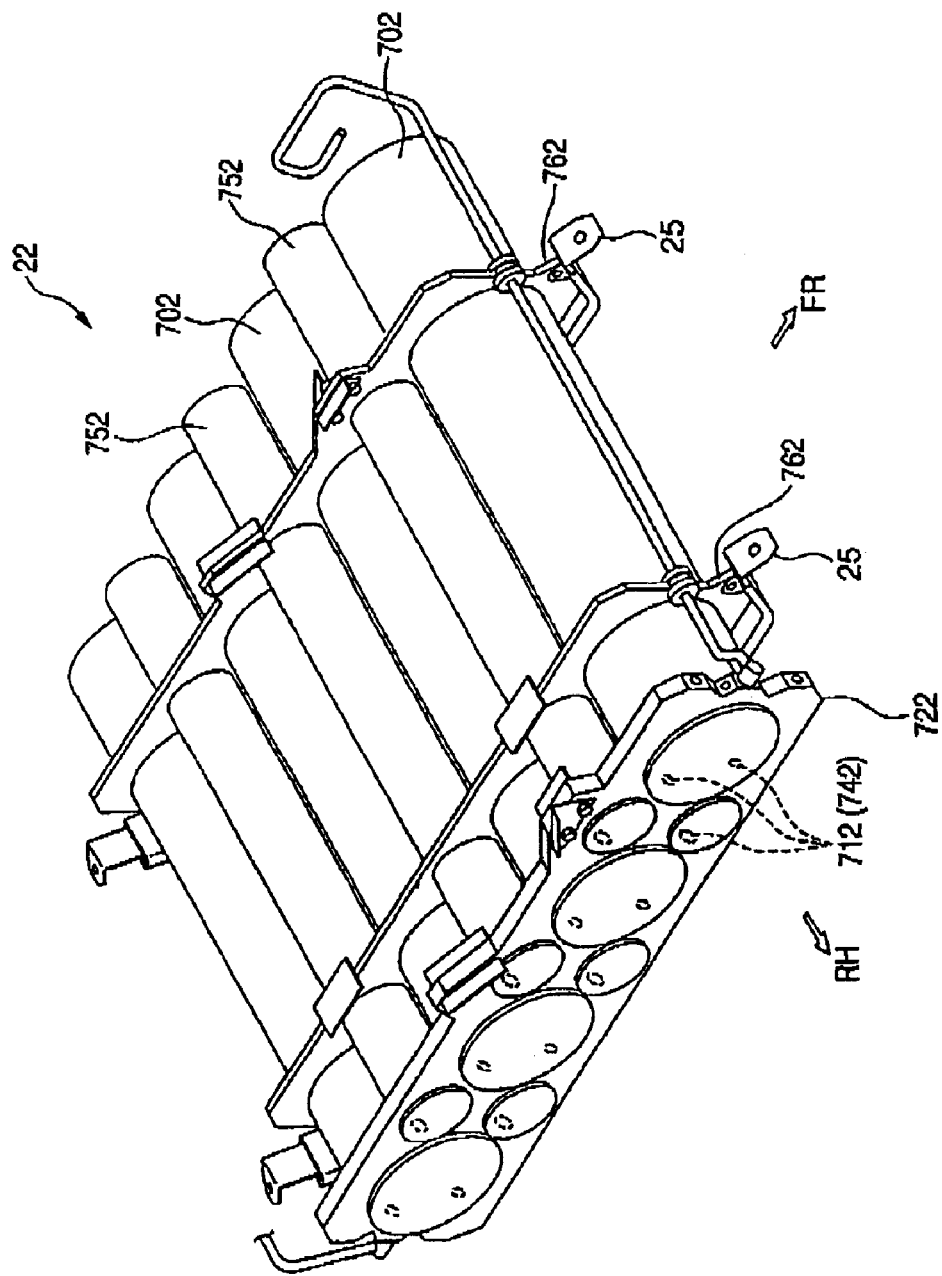
FIG. 12 is a perspective view of a second fuel tank of the third embodiment of the invention when seen from the right front side thereof.

FIG. 12 is a perspective view of the second fuel tank 22 when seen from the right front side thereof.

As shown in the figure, the second fuel tank 22 is configured in a manner that the plurality of tank main bodies 702 and the tank members 752 are coupled and fixed to one another in a state of being aligned at their right side end portions thereof (a side shown by an arrow RH in the figure).

Specifically, the communication plate 722 made of aluminum, for example, is attached at the right side end portions of the tank main bodies 702 and the tank members 752 so as to cross thereamong thereby to combine the tank main bodies 702 and the tank members 752 with the entire circumferential peripheries of the respective through holes of the communication plate 722.

Coupling plates 762, 762 (plate members) made of aluminum, for example, are attached at two intermediate regions at both end portions of the tank main bodies 302 and the tank members 752 so as to cross thereamong, respectively, thereby to combine the tank main bodies 702 and the tank members 752 with the entire circumferential peripheries of the respective through holes of the coupling plates 762, 762.

A communication hole 712 is formed at the right side end portion of each of the tank main bodies 702 and the tank members 752, and the tank main bodies 702 and the tank members 752 communicate with one another through a communication path 742 formed within the communication plate 722. Further, the length to the left side end portion of each of the tank main bodies 702 and the tank members 752 is determined so as to fit the space within which the second fuel tank 22 is disposed.

Figure 13:
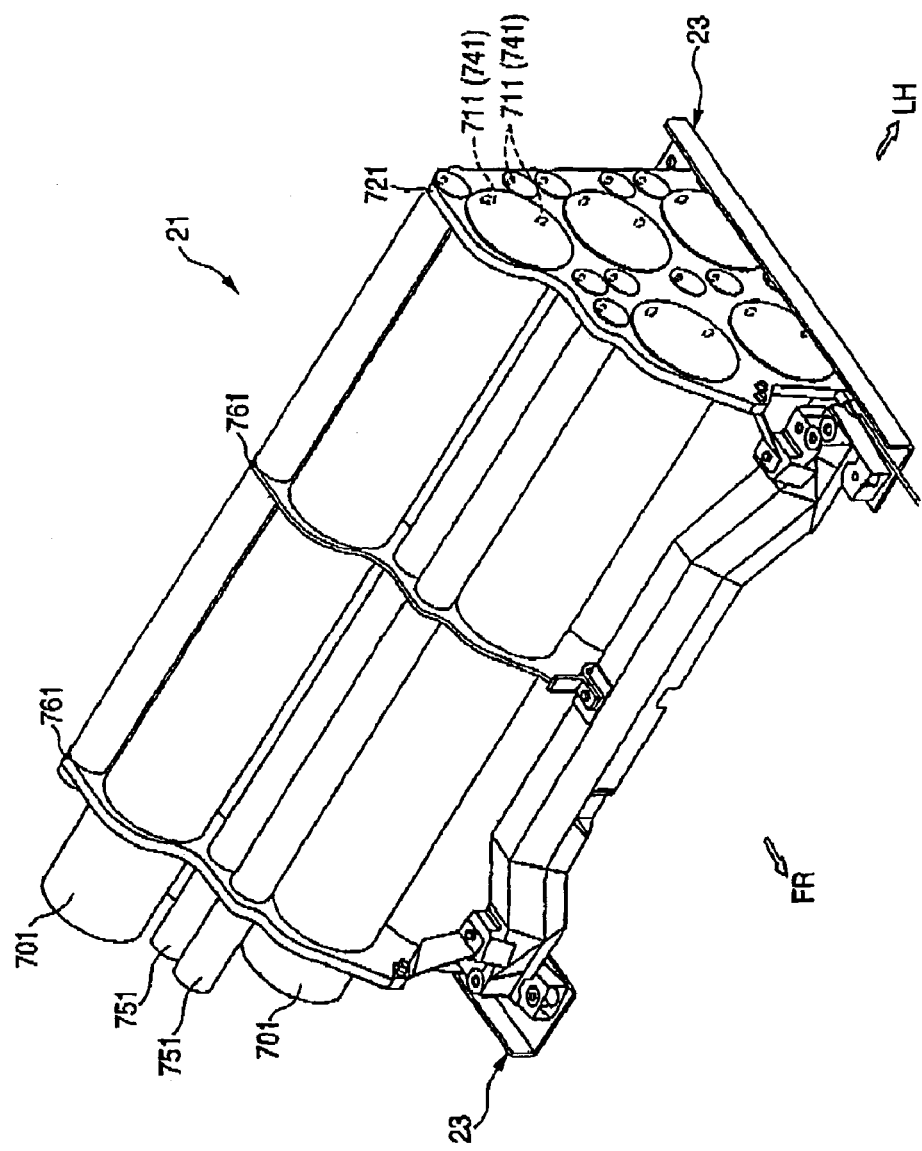
FIG. 13 is a perspective view of a first fuel tank of the third embodiment of the invention when seen from the left front side thereof.

FIG. 13 is a perspective view of the first fuel tank 21 when seen from the left front side thereof.

As shown in the figure, the first fuel tank 21 is configured in a manner that the plurality of tank main bodies 701 and the tank members 751 are coupled and fixed to one another in a state of being aligned at their right side end portions thereof (a side shown by an arrow LH in the figure).

Specifically, the communication plate 721 made of aluminum, for example, is attached at the left side end portions of the tank main bodies 701 and the tank members 751 so as to cross thereamong thereby to combine the tank main bodies 701 and the tank members 751 with the entire circumferential peripheries of the respective through holes of the communication plate 721.

Coupling plates 761, 761 (plate members) made of aluminum, for example, are attached at two intermediate regions at the both end portions of the tank main bodies 701 and the tank members 751 so as to cross thereamong, respectively, thereby to combine the tank main bodies 701 and the tank members 751 with the entire circumferential peripheries of the respective through holes of the coupling plates 761, 761.

A communication hole 711 is formed at the left side end portion of each of the tank main bodies 701 and the tank members 751, and the tank main bodies 701 and the tank members 751 communicate with one another through a communication path 741 formed within the communication plate 721. Further, the length to the right side end portion of each of the tank main bodies 701 and the tank members 751 is determined so as to fit the space within which the first fuel tank 21 is disposed.

Figure 14:
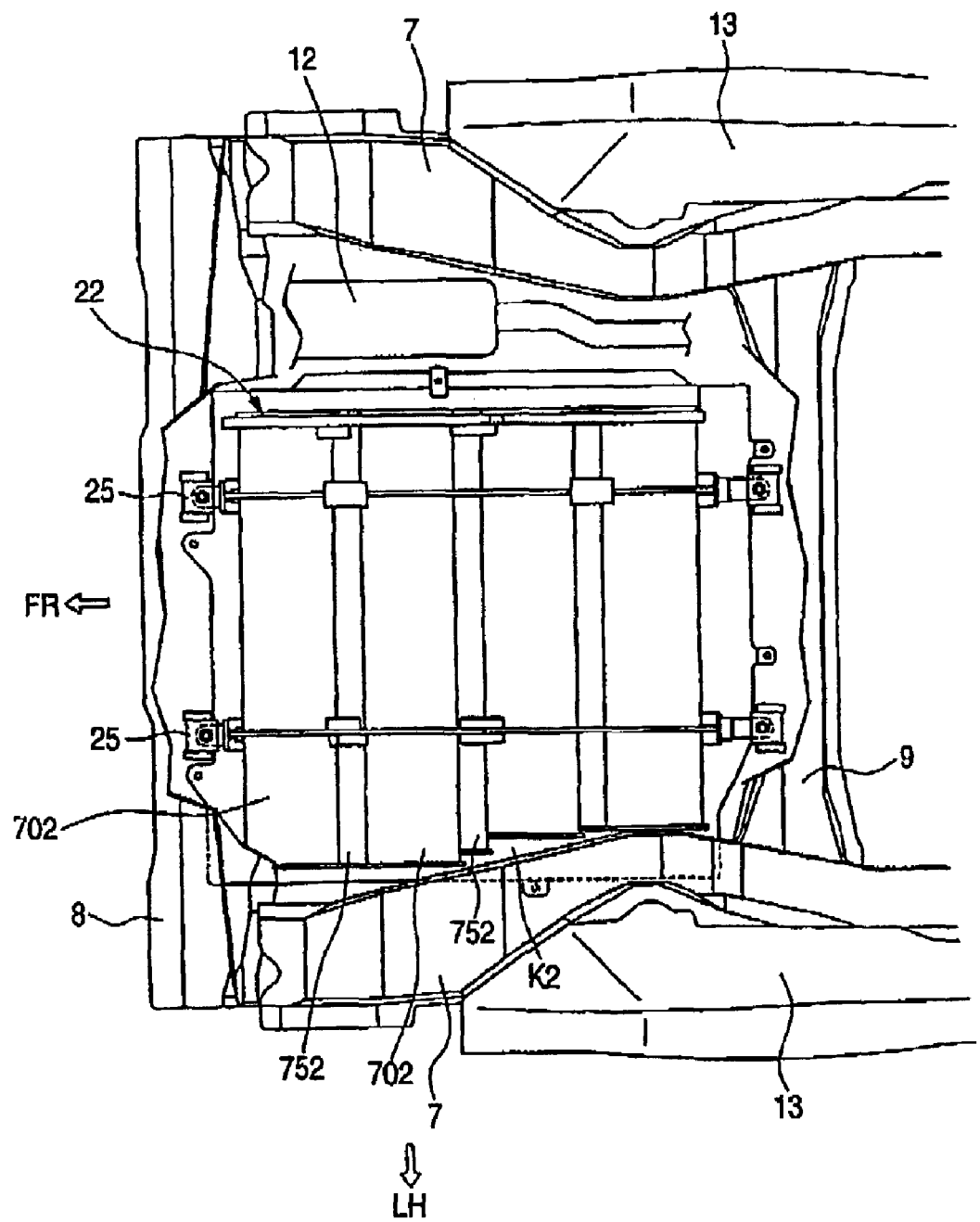
FIG. 14 is a plan view of the second fuel tank and the peripheral portion thereof.

FIG. 14 is a plan view of the second fuel tank 22 and the peripheral portion thereof.

As shown in the figure, the second fuel tank 22 is disposed at a position surrounded by a pair of the side frames 7, 7 extending in the longitudinal direction (in the left and right direction in FIG. 14) and the middle cross member 8 and the rear cross member 9 each extending in the vehicle width direction (elevational direction in FIG. 14).

Here, the second fuel tank 22 is arranged in a manner that the extended position of the left side end portion of each of the tank main bodies 702 is individually changed so as to cope with a wheelhouse 13 and the change in the vehicle width direction of the side frame 7 so that the length of the tank main body 702 serving as the major fuel gas containing portion is made as long as possible. Further, in order to use the space portions K2 at the peripheries of the tank main bodies 702 without waste as the fuel gas containing portion, the extended position of the left side end portion of each of the tank members 752 is individually changed so as to cope with the wheelhouse 13 and the change in the vehicle width direction of the side frame 7 so that the length of the tank member 752 is made as long as possible.

Figure 15:
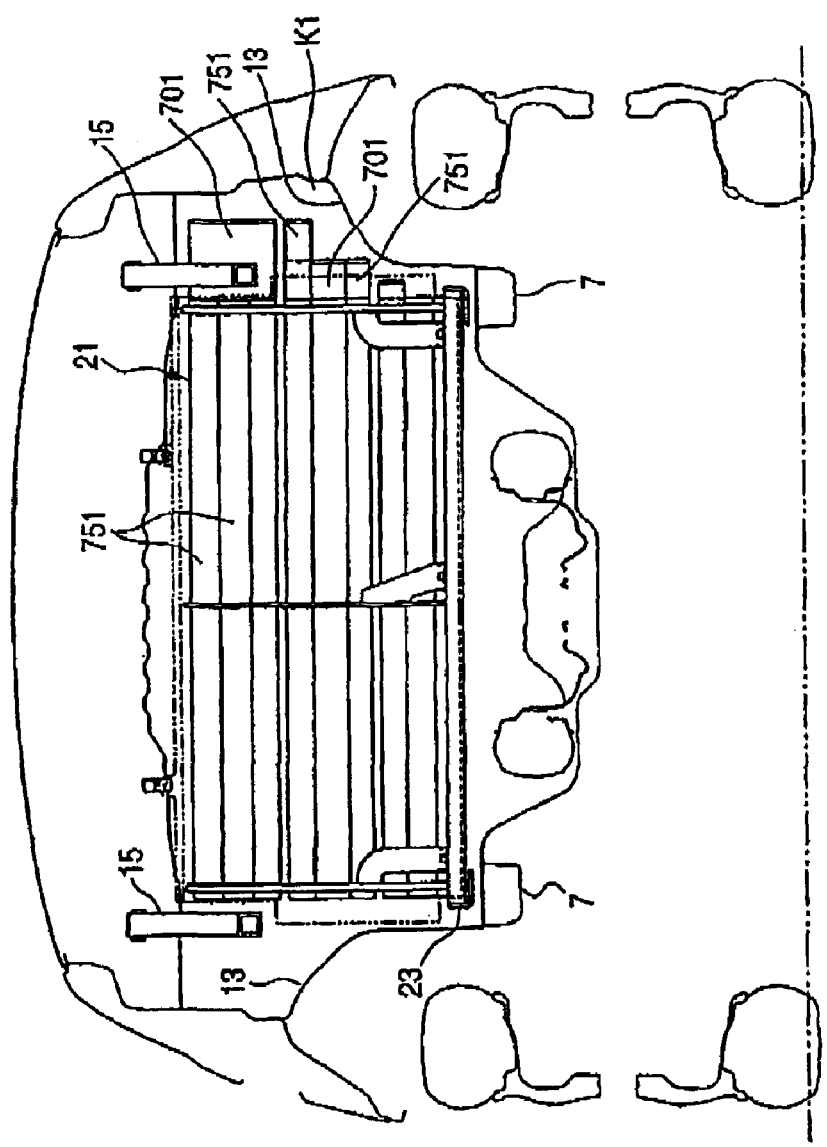
FIG. 15 is a rear view of the first fuel tank and the peripheral portion thereof.
Figure 16:
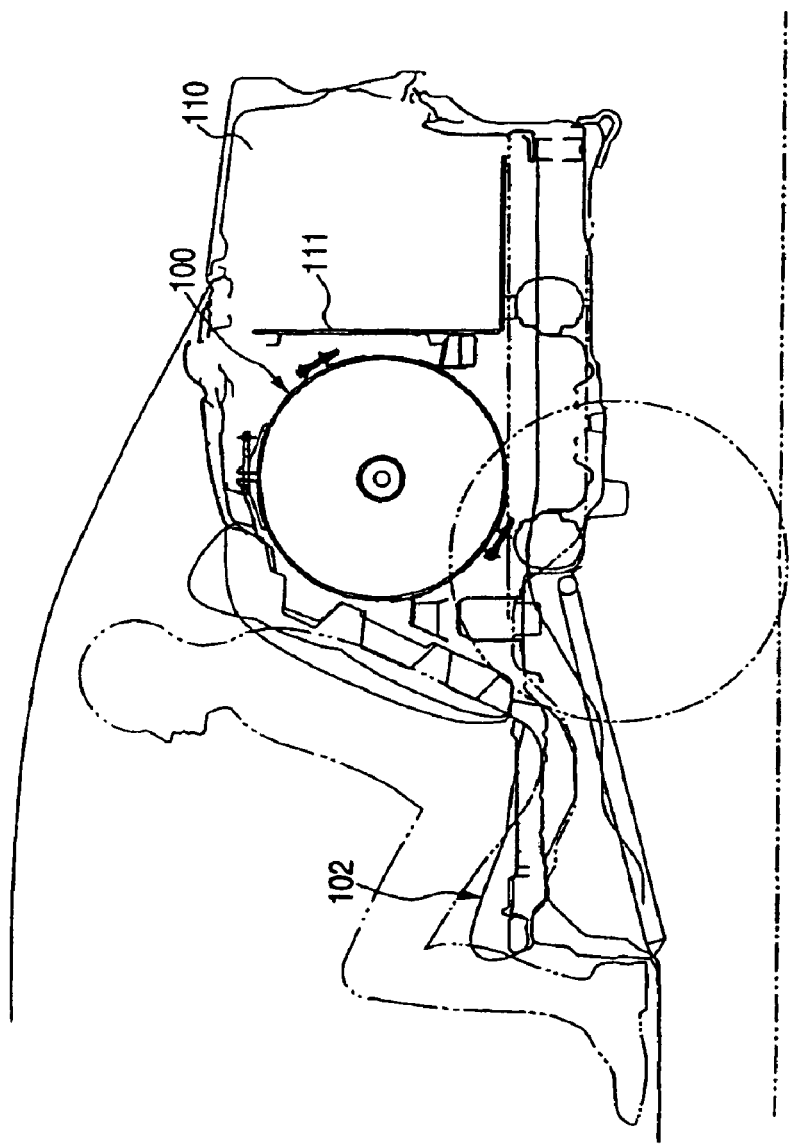
FIG. 16 is an explanatory side view of a conventional example.

FIG. 15 is a rear side view of the first fuel tank 21 and the peripheral portion thereof.

As shown in the figure, the first fuel tank 21 is disposed at the inside of the wheelhouse 13 expanding at the inside in the vehicle width direction.

Here, the first fuel tank 21 is arranged in a manner that the extended position of the right side end portion of each of the tank main bodies 701 is individually changed so as to cope with the vehicle body configuration of the right side wall of the vehicle room so that the length of the tank main body 701 serving as the major fuel gas containing portion is made as long as possible. Further, in order to use the space portions K1 at the peripheries of the tank main bodies 701 without waste as the fuel gas containing portion, the extended position of the right side end portion of each of the tank members 751 is individually changed so as to cope with the trunk hinge 15 and the vehicle body configuration of the right side wall of the vehicle room so that the length of the tank member 751 is made as long as possible.

According to the aforesaid configuration, the plurality of tank main bodies 701, 702 and the plurality of tank members 751, 752 disposed densely are coupled and fixed to one another so as not to move relative to the plates 761, 762 and the communication plates 721, 722, respectively. Further, since the tank main bodies 701, 702 and the tank members 751, 752 communicate with the communication plates 721, 722 etc., the plurality of tank main bodies 701, 702 and the plurality of tank members 751, 752 are integrated as the single fuel tank 20.

Since the extended position of the end portion of each of the tank main bodies 701, 702 and the tank members 751, 752 is individually changed and how to arrange these bodies and members and the numbers thereof to be arranged is adjusted, the configuration of the fuel tank can be freely adapted to the configuration of the fuel tank mount portion. Thus, the fuel tank mount portion can be used as the fuel gas containing portion without waste. Therefore, the fuel tank mount portion within the trunk room 10 and beneath the rear floor 6 can be reduced while securing a sufficient fuel gas capacity, and the space within the vehicle room such as the trunk room 10 etc. can be secured sufficiently.

Further, when the tank main bodies 701, 702 and the tank members 751, 752 are fixed rigidly, the intensity and the rigidity of the first fuel tank 21 and the second fuel tank 22 can be enhanced.

Particularly, since the outer diameter of each of the tank main bodies 701, 702 is set to be as large as possible, the rigidity of the coupling portions between the communication plates 721, 722 and the coupling plates 761, 762 is enhanced. Further, in the case where a force is applied to the first fuel tank 21 and the second fuel tank 22 in a twist direction, the stress is also dispersed to the tank members 751, 752 disposed at the peripheries of the tank main bodies 701, 702, whereby the torsional rigidity of the first fuel tank 21 and the second fuel tank 22 can be enhanced. Furthermore, the compression intensity in the longitudinal direction of these tanks can be enhanced.

In a modification of the third embodiment, the length of one end portion of each of the tank main bodies 701, 702 and the tank members 751, 752 may be determined in accordance with the space where the first and second fuel tanks are disposed in the same manner as the other end potions thereof instead of aligning the one end portions thereof.

According to such a configuration, in the first fuel tank 21, the extended position of the left side end portion of each of the tank main bodies 701 can be individually changed like the right side end portions thereof. Also, in the second fuel tank 22, the extended position of the right side end portion of each of the tank main bodies 702 can be individually changed like the left side end portions thereof. Thus, the fuel tank mount portion can be utilized further efficiently as the fuel gas containing portion without waste.

Incidentally, the invention is not limited to the aforesaid embodiment, and the respective numbers and the sizes etc. of the tank main bodies 301, 302, 501, 502, 701, 702 and the tank members 751, 752 can be suitably changed so as to cope with a vehicle, for example.

Further, although the aforesaid embodiment is configured as an absorption type low-pressure gas tank, the gas tank 20 according to the invention may be configured as a normal low-pressure gas tank containing no adsorbent such as activated charcoal etc.

Furthermore, the gas tank according to the invention may be configured as an absorption type high-pressure gas tank or a normal high-pressure gas tank containing no adsorbent. In this case, the material of the tank main bodies is preferably changed from aluminum to rigid material such as stainless steel.

Furthermore, the invention is applicable not only to a vehicle using natural gas but also to vehicles using gaseous fuel such as a fuel cell powered vehicle.

What is claimed is:

1. A fuel tank structure for a vehicle using gaseous fuel, comprising:
    a plurality of tank main bodies communicating with one another, each of the tank main bodies having a cylindrical portion, the plurality of tank main bodies being disposed at a fuel tank mount portion in a state of being adjoined with one another, and
    a plate member provided so as to cross among the plurality of tank main bodies, the plate member having a communication path for communicating among the respective tank main bodies, wherein the respective tank main bodies are attached to the plate member at the cylindrical portions of the tank main bodies so as to communicate with the communication path in the plate member and with one another.

2. The fuel tank structure according to claim 1, wherein the plate member is disposed at an intermediate region between both end portions of the respective tank main bodies.

3. The fuel tank structure according to claim 1, wherein the plate member connects the plurality of tank main bodies, and the tank main bodies are fixed to the fuel tank mount portion through the plate member.

4. The fuel tank structure according to claim 3, wherein a band member is attached to the plate member, and the tank main bodies are fixed to the fuel tank mount portion through the band member.

5. The fuel tank structure according to claim 1, wherein the plurality of tank main bodies are respectively disposed within the fuel tank mount portion so as to be aligned in their longitudinal direction, wherein the tank structure further comprises at least one cylindrical tank member, wherein the cylindrical portion has a diameter smaller than cylindrical portions of the tank main bodies and is disposed at a space portion generated in the periphery of the plurality of tank main bodies so as to be aligned in the longitudinal direction with the tank main bodies, and wherein the tank main bodies are respectively coupled with the tank member so as to communicate with one another.

6. The fuel tank structure according to claim 1, wherein the fuel tank mount portion includes a first fuel tank mount portion defined between a rear seat and a partition plate disposed on a trunk room in the longitudinal direction of the vehicle, and a second fuel tank mount portion formed at a lower surface side of a rear floor, and wherein the tank main bodies disposed in the first fuel tank mount portion and the tank main bodies disposed in the second fuel tank mount portion communicate with one another.

* * * * *